Patented May 11, 1943

2,319,078

UNITED STATES PATENT OFFICE 2,319,078

AMINOPHENOL AND ITS PREPARATION

James G. McNally and Joseph B. Dickey, Rochester, N. Y., assignors to Eastman Kodak Company, Rochester, N. Y., a corporation of New Jersey No Drawing. Application June 13, 1940, Serial No. 340,364

8 Claims. (Cl. 260—509)

This invention relates to aminophenols and to their preparation.

A number of N-alkylaminophenols are known, e. g. N-methyl-p-aminophenol (which, in the form of its sulfate, is known in the trades as "Elon" or "Metol"), N-ethyl-p-aminophenol, N-(n-primarybutyl)-p-aminophenol, N-(n-primaryamyl)-p-aminophenol and N-furfuryl-(furylmethyl)-p-aminophenol. The salts of N-methyl-p-aminophenol have been extensively employed as photographic developers for many years. The salts of the N-butyl, N-amyl and N-furfuryl compounds, however, are of little utility for such a purpose, owing, at least in part, to their low solubility in aqueous media.

We have now found that N-sulfoalkyl-p-aminophenols can be prepared by condensing a p-aminophenol or an ester thereof with a salt of a halogenated alkane sulfonic acid; hydrolyzing the resulting condensation product, if an ester of a p-aminophenol is employed. The alkali metal salts of N-sulfoalkyl-p-aminophenols act as very good photographic developers, we have found.

It is, accordingly, an object of our invention to provide N-sulfoalkyl-p-aminophenols and their salts. A further object is to provide a process for preparing these compounds. A still further object is to provide photographic developers comprising these compounds. Other objects will appear hereinafter.

According to one embodiment of our invention, we prepare N-sulfoalkyl-p-aminophenols by condensing a p-aminophenol or an ester thereof (i. e. a p-acyloxyaniline) with a salt of a halogenated alkane sulfonic acid. The condensations are advantageously effected in the presence of an acid binding agent. Tertiary amines, such as dialkylanilines are especially suitable acid-binding agents. When an ester of a p-aminophenol is employed, the resulting condensation product must be hydrolyzed, in order to obtain the unesterified product. The condensations are advantageously effected in an inert atmosphere, such as an atmosphere of nitrogen. The following examples will serve to illustrate the manner of practicing our invention. These examples are not intended to limit our invention.

EXAMPLE 1.—N-(β-sulfoethyl)-p-aminophenol

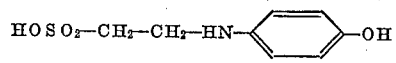

50 g. (0.3 mol.) of p-acetoxyaniline and 21.1 g. (0.1 mol.) of sodium β-bromo-ethane sulfonate were mixed together and heated 3 to 4 hours in an atmosphere of nitrogen. The reaction mixture was cooled and dissolved in water, and then made neutral to Congo red with sodium bicarbonate. During the dissolving in water and neutralization, the acetoxy group is removed by hydrolysis. The neutral aqueous solution was then treated with a suitable solvent (benzene, diethyl ether or ethyl acetate) to remove any p-aminophenol which might be present by virtue of hydrolysis of unreacted p-acetoxyaniline. Any unreacted and undecomposed p-acetoxyaniline is likewise removed by this solvent treatment. The resulting aqueous residue was decolorized with "Norite," and then concentrated to the point where crystals separated upon cooling. The white crystals thus obtained were the sodium salt of N-(β-sulfoethyl)-p-aminophenol. The free aminophenol, formulated above, can be obtained by treating an aqueous solution of the sodium salt with a mineral acid, such as hydrochloric or sulfuric acid. In this manner the free aminophenol was obtained as white crystals.

EXAMPLE 2.—N-(γ-sulfo-n-propyl)-p-aminophenol

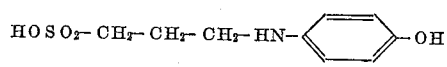

16 g. (0.1 mol.) of p-acetoxyaniline and 18 g. (0.1 mol.) of sodium γ-chloropropane sulfonate were mixed together in 75 g. of dimethylaniline. The mixture was boiled, under reflux, for 3 to 4 hours. The reaction mixture was cooled and treated with sodium bicarbonate to free the dimethylaniline from combination with the hydrogen chloride which split out during the condensation. The dimethylaniline was then removed by steam distillation. The resulting aqueous solution was treated to hydrolyze the acetoxy group from the condensation product and finally decolorized with "Norite." It was then concentrated until crystals separated upon cooling. The white crystals thus obtained were the sodium salt of N-(γ-sulfo-n-propyl)-p-aminophenol. The free aminophenol can be obtained as white crystals in the manner described in Example 1.

Instead of p-acetoxyaniline in the foregoing example, p-aminophenol can be employed.

EXAMPLE 3.—N-(δ-sulfo-n-primarybutyl)-1-amino-3-methoxy-4-hydroxy benzene

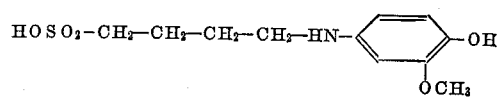

13.9 g. (0.1 mol.) of p-hydroxy-m-methoxyaniline and 28.6 (0.1 mol.) of sodium δ-iodobutane sulfonate were mixed together in 75 cc. of dimethyl aniline. The mixture was boiled, under reflux, for from 3 to 4 hours. The reaction mixture was cooled and treated with sodium bicarbonate to free the dimethyl-aniline from combination with the hydrogen iodide which split out during the condensation. The dimethylaniline was then removed by steam distillation. The resulting aqueous solution was decolorized with "Norite" and finally concentrated to the point where crystals formed upon cooling. The white crystals thus obtained were the sodium salt of N-(δ-sulfo-n-primarybutyl)-1-amino-3-methoxy-4-hydroxy benzene. The free aminophenol can be obtained in the manner described in Example 1.

Our new N-sulfoalkyl-p-aminophenols can also be obtained by condensing a hydroquinone with a salt of an aminoalkane sulfonic acid. The following example illustrates the process.

EXAMPLE 4.—*N-(β-sulfoethyl)-p-aminophenol*

11 g. (0.1 mol.) of hydroquinone and 30 g. (0.3 mol.) of sodium taurinate were mixed together in 50 cc. of water. The mixture was heated in an autoclave at 190° to 200° C. for from 3 to 4 hours. The reaction mixture was cooled and treated with diethyl ether to remove any unreacted hydroquinone. The resulting aqueous solution was then concentrated until crystals separated upon cooling. The white crystals thus obtained were the sodium salt of N-(β-sulfoethyl)-p-aminophenol. The free aminophenol can be obtained therefrom in the manner described in Example 1.

The water-soluble salts, especially the alkali metal salts of our N-sulfoalkyl-p-aminophenols have good photographic developing powers and can be employed instead of "Metol" in compounding photographic developers.

What we claim as our invention and desire to be secured by Letters Patent of the United States is:

1. A N-sulfoalkyl-p-aminophenol selected from the group consisting of N-(β-sulfoethyl)-p-aminophenol, N-(γ-sulfo-n-propyl)-p-aminophenol and N-(δ-sulfo-n-primary butyl)-1-amino-3-methoxy-4-hydroxy benzene.

2. N-(β-sulfoethyl)-p-aminophenol.

3. N-(γ-sulfo-n-propyl)-p-aminophenol.

4. N-(δ-sulfo-n-primarybutyl)-1-amino-methoxy-4-hydroxy benzene.

5. A process for preparing a N-sulfoalkyl-p-aminophenol comprising condensing by heating to reacting temperature a compound selected from the group consisting of p-aminophenols and esters of p-aminophenols with a salt of a halogenated alkane sulfonic acid of the following general formula.

$$X—(CH_2)_n—SO_3H$$

wherein $n$ represents a positive integer of from 2 to 4 and X represents a halogen atom.

6. A process for preparing a N-sulfoalkyl-p-aminophenol comprising condensing by heating to reacting temperature a p-acyloxyaniline with a salt of a halogenated alkane sulfonic acid, and hydrolyzing the acyl group from the resulting condensation product of the following general formula:

$$X—(CH_2)_n—SO_3H$$

wherein $n$ represents a positive integer of from 2 to 4 and X represents a halogen atom.

7. A process for preparing a N-(β-sulfoethyl)-p-aminophenol comprising condensing by heating to reacting temperature a p-acetoxyaniline with sodium β-bromoethane sulfonate, and hydrolyzing the acetyl group from the resulting condensation product.

8. A process for preparing a N-(γ-sulfo-n-propyl)-p-aminophenol comprising condensing by heating to reacting temperature p-acetoxyaniline with sodium γ-chloropropane sulfonate, and hydrolyzing the acetyl group from the resulting condensation product.

JAMES G. McNALLY.
JOSEPH B. DICKEY.

CERTIFICATE OF CORRECTION.

Patent No. 2,319,078. May 11, 1943.

JAMES G. McNALLY, ET AL.

It is hereby certified that error appears in the printed specification of the above numbered patent requiring correction as follows: Page 2, second column, lines 22, 23 and 24, claim 6, strike out the comma and words ", and hydrolyzing the acyl group from the resulting condensation product" and insert the same after "atom" and before the period in line 29, same claim; and that the said Letters Patent should be read with this correction therein that the same may conform to the record of the case in the Patent Office.

Signed and sealed this 3rd day of August, A. D. 1943.

(Seal)

Henry Van Arsdale,
Acting Commissioner of Patents.